Aug. 17, 1937. J. MIHALYI 2,090,060
DOUBLE EXPOSURE PREVENTION CAMERA
Filed Oct. 30, 1936 2 Sheets-Sheet 1
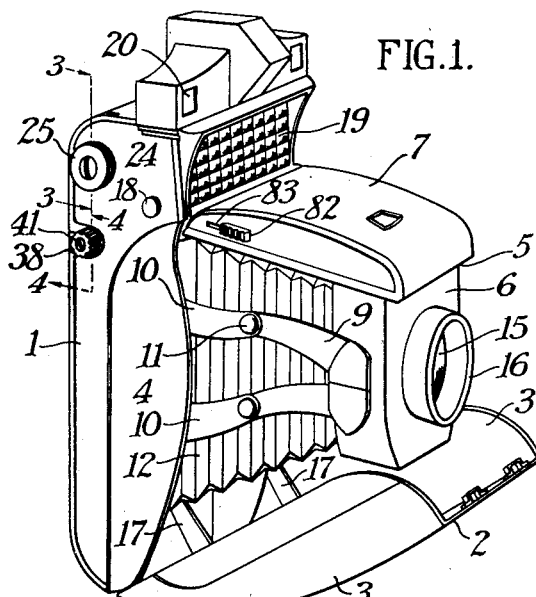
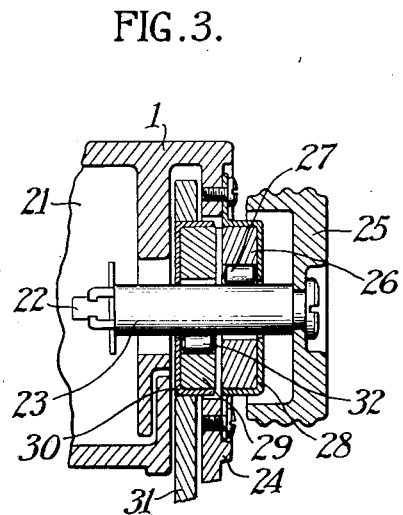
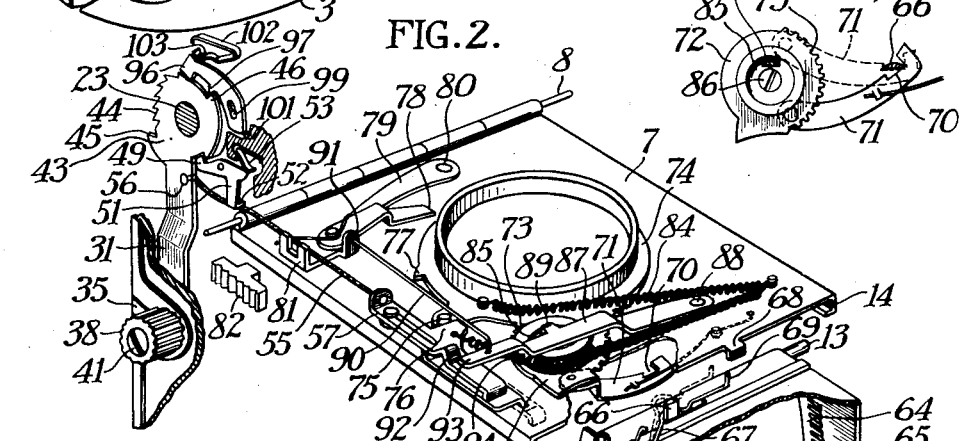
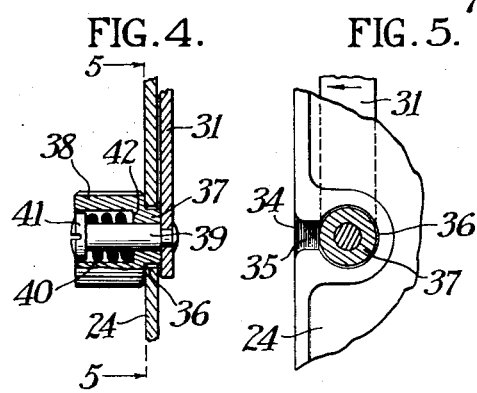
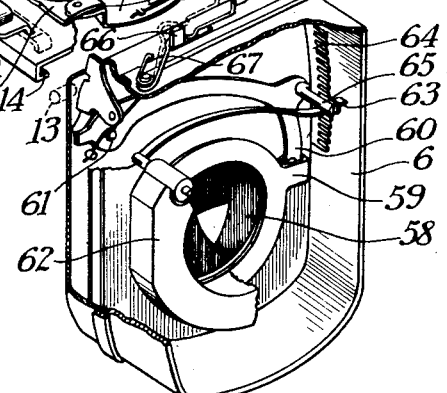
INVENTOR.
Joseph Mihalyi
BY
ATTORNEYS Aug. 17, 1937.  J. MIHALYI  2,090,060
DOUBLE EXPOSURE PREVENTION CAMERA
Filed Oct. 30, 1936  2 Sheets-Sheet 2
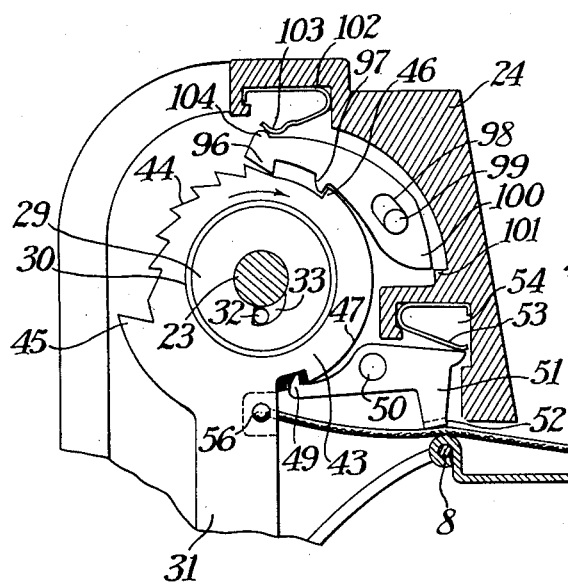
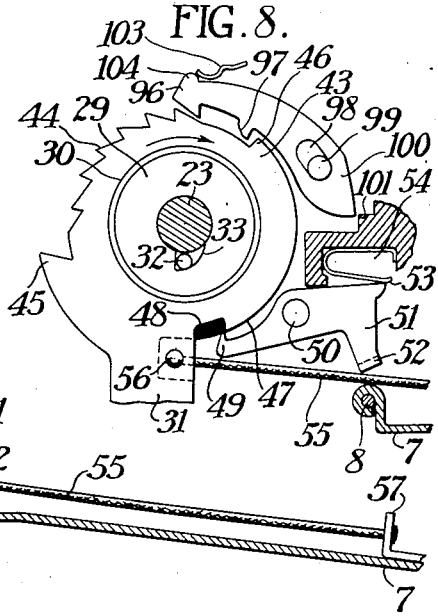
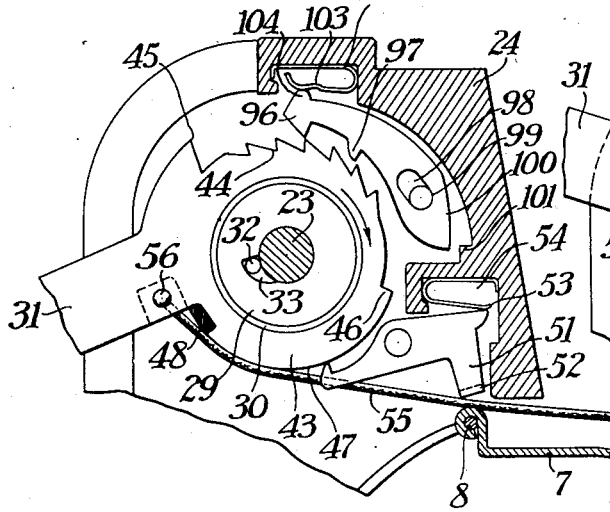
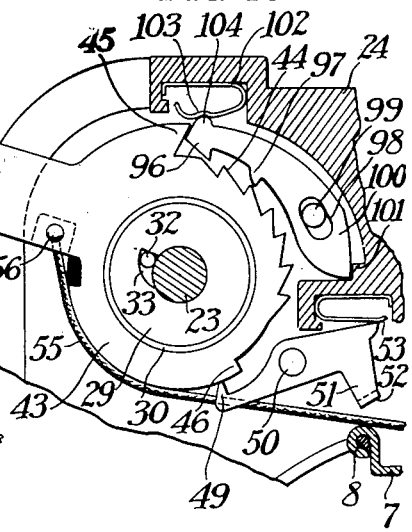
INVENTOR.
Joseph Mihalyi
BY
ATTORNEYS Patented Aug. 17, 1937

2,090,060

UNITED STATES PATENT OFFICE 2,090,060

DOUBLE EXPOSURE PREVENTION CAMERA

Joseph Mihalyi, Rochester, N. Y., assignor to Eastman Kodak Company, Rochester, N. Y., a corporation of New Jersey Application October 30, 1936, Serial No. 108,397

23 Claims. (Cl. 95—32)

This invention relates to photography and more particularly to photographic cameras.

One object of my invention is to provide a camera with interlocking mechanism between the film winding structure and the shutter structure, so arranged that each is under the control of the other. Another object of my invention is to provide a film winding device in which the film winding lever is locked against movement until the shutter parts reach a predetermined position. Another object of my invention is to provide a photographic shutter in which the setting operation takes place through movement of the film winding mechanism. Another object of my invention is to provide a film winding key mounted to move axially in the camera, the sole support for the key being a pair of one-way clutches, one carried by the camera body and the other carried by the winding arm. Another object of my invention is to prevent the operation of the shutter trigger unless the film winding mechanism is in a predetermined position. Another object of my invention is to provide a seat or latch for the film winding arm in which the handle of the arm may be retained in an inoperative position against movement. Other objects will appear from the following specification, the novel features being pointed out in the claims at the end thereof.

Coming now to the drawings wherein like reference characters denote like parts throughout:

Fig. 1 is a perspective view of a camera constructed in accordance with and embodying my invention;

Fig. 2 is a fragmentary perspective view of some of the shutter parts which are shown in the drawings in a partially separated position, to best illustrate the working elements carried by these parts;

Fig. 3 is a fragmentary detail section through the winding key post and its support, taken on line 3—3 of Fig. 1;

Fig. 4 is a fragmentary section on line 4—4 of Fig. 1;

Fig. 5 is a fragmentary side elevation partially in section of the winding arm latch;

Fig. 6 is a detail plan view of the shutter leaf driving mechanism;

Fig. 7 is a fragmentary side elevation partially in section showing the film winding structure and its connection to the shutter;

Figs. 8, 9 and 10 are fragmentary views similar to Fig. 7, but with the parts shown in a series of different positions to illustrate the functions of the various elements.

In the embodiment of my invention illustrated in the drawings, I have illustrated a camera with interlocking mechanism between the film wind and the shutter mechanism designed to prevent the operation of the shutter trigger unless the film winding mechanism is in a predetermined position, to prevent the operation of the film winding mechanism unless the shutter mechanism is in a predetermined position, to prevent the film winding arm from being moved through less than a full stroke during the first stroke made to wind film, to prevent the film winding arm from being retained against movement less than a full stroke after the first stroke in winding film has been completed, and to latch the shutter trigger until the shutter setting mechanism has been released to return to a normal inoperative position. While these are the main functions accomplished by the structure which will be hereinafter more fully described, there are other incidental functions which improve the operation of the camera and tend to prevent it from being incorrectly used.

In the embodiment illustrated, the camera may consist of a body portion 1 to which a bed 2 is hinged, the bed having side flanges 3 adapted to telescope the recess portions 4 of the side of the camera when the camera is folded. This camera preferably carries a shutter which is made in two parts and which is designated broadly as 5. This shutter is fully described and claimed in my copending application Serial No. 108,396 filed October 30, 1936, and only such parts of the shutter as are necessary for a complete understanding of this invention are shown in connection with this application.

The shutter is contained in two casings, one part, 6, forming the camera front, and the other part, 7, being hinged to the camera body on a pintle 8.

The camera front 6 is preferably supported by similar pairs of lazy tongs 9 and 10 pivotally connected at 11, the pivotal points of which separate in a well known manner as the front 6 is moved parallel to the camera body into a folded position. A bellows 12 connects the usual exposure frame and the camera front 6.

Referring to Fig. 2, the camera front 6 is provided with a pair of shafts 13 which are shown removed from, but which nevertheless slide in the overturned flanges 14. Thus, during the opening movement of the camera, the pins 13 slide in the tracks 14 and the casing 7 swings about its hinge 8 as the camera front 6 is moved to an operative position.

The camera front 6 may be provided with an objective 15 and in the form shown, focusing is accomplished by turning the front lens cell 16 in a manner well known in the art.

The camera bed 2 may be supported in its open position by bed braces 17 which may be released by pressing the push button 18 on the side walls of the camera.

While not important for the present invention, the camera is preferably equipped with a light-sensitive meter 19 for measuring the light and for automatically adjusting parts of the camera mechanism, and may be equipped with a range finder 20. As thus far described, the parts are not essential to my present invention.

Coming now to the invention to be claimed herein, the winding mechanism will be described first. As indicated in section in Fig. 3, the camera body 1 is provided with a spool chamber 21 in which a winding key flange 22 of the usual type is employed to engage the slot in a film spool. This flange is carried by a shaft 23 passing entirely through the side wall 24 of the camera and terminating in a knob 25. The support for the shaft 23 in the side wall of the camera consists of a one-way clutch 26 of a known type in which a roller 27 lies in an arcuate race, so that it will bind and prevent the shaft from turning in one direction, and so that it will run freely and permit the shaft to turn in an opposite direction. This clutch member is held in place by a casing 28. The clutch is similar to the clutch shown in Fig. 7, wherein the key shaft 23 passes through the clutch 29 carried by a casing 30 on the winding arm 31. This clutch, like the one above described, consists of a roller 32 movable in an arcuate race 33, so as to bind and cause the shaft to turn in the direction shown by the arrow when the winding arm 31 is moved in a clockwise direction with regard to Fig. 7, this roller releasing the shaft when the arm is turned in an opposite direction.

The arm 31, which is an oscillatable part which can be moved back and forth to wind film, moves between two limits of movement, the upper limit is defined by stops which will be later described, and the lower limit, or the normal position of rest, being determined by the latch seat 34. Referring to Figs. 5 and 6, it will be seen that the side wall 24 of the camera is provided with an opening having a narrow neck 35 and an enlarged area 36 adapted to receive the annular shank 37 of the winding handle 38. The winding handle is held to the arm 31 by means of a post 39 surrounded by a coiled spring 40 which bears against the head of the post 41 and a shoulder 42 in the handle. Thus, by drawing out upon the handle 38, the spring is compressed and the cylindrical portion 37 can be drawn out of the annular recess 36 so that the handle 31 may be turned to wind film.

However, it is desirable to lock the film winding mechanism against movement until an exposure has been made. To accomplish this, the following mechanism is employed: Referring to Fig. 7, it will be seen that the winding arm 31 is provided with an enlarged head 43, a part of which 44 has been provided with ratchet teeth, a lug 45, a shoulder 46, an arcuate surface 47 and a notch 48.

The notch 48 is designed to latch the handle 31 against movement until the shutter parts are in a predetermined position. This is accomplished in the following manner: The notch 48 is adapted to receive a hook 49 of a latch member pivoted at 50 and having an arm 51 with an inwardly turned flange 52. A spring 53, in a recess 54, tends to press the latch into the latching position shown in Fig. 7.

However, the latch can be moved from this position by means of a flexible connection 55 attached to the winding arm at 56 and attached to a slide 57 which forms a part of the shutter. When the flexible connection 55, which may be in the form of a cable or chain, is drawn taut, as indicated in Fig. 8, it presses upon the overturned end 52 of the pivoted latch member and swings the hook 49 from its operative engagement with the notch 48.

Thus, the arm 31 is released, and by pulling out the handle 38 and moving the arm 31, film can be wound, subject to other conditions which will be later described. As indicated in Fig. 8, during the winding movement the latch member 49 rides idly over the arcuate surface 47, but when the winding has been completed and the handle 38 returned to its normal position of rest, the latch member 49 will be in position to engage the notch 48.

A few of the shutter parts necessary to understand this invention will be described next. However, the complete shutter is fully shown and described in my copending application above referred to.

In the shutter front 6 I prefer to mount the diaphragm which is here shown as consisting of leaves 58, many of which have been omitted for the sake of clearness, which can be opened and closed by turning the diaphragm ring 59, this ring being attached to an arm 60 pivoted at 61 so that this arm can move and can be controlled by the light intensity measured by the light meter 19. Light falling on the meter 19 actuates the light-sensitive element 62, so that the arm 63 swings freely, and just before an exposure is made the comb-like member 64, which passes through the slotted guide post 65, engages the arm, and by swinging the lever 60 until it engages the meter arm 63, the diaphragm is automatically set in accordance with the prevailing light conditions. This structure is more fully described in my copending application Serial No. 106,552, filed October 20, 1936.

The shutter leaves which lie behind the diaphragm leaves 58 may be actuated in a known manner by the post 66 which is held against movement by a spring latch 67 until the shutter front slides to its outermost position as the pins 13 move through the guideways 14. At its outer position a lug 68 on the member 7 engages the upstanding end 69 of the spring latch and swings it to the position shown in dotted lines, in which the post 66 is released. However, by this time the post 66 has become engaged by the notch 70 of the driving arm 71 which is attached to the driving member 72, this member being driven through a gear 73 from a shutter setting member 74.

The driving member 72 is driven through somewhat more than 90°, moving the arm 71 rapidly back and forth to open and close the shutter blades in a known manner. During the setting movement, as illustrated in Fig. 6, the hook-like member 70 rides past the post 66 idly, and consequently does not open and close the shutter while the shutter is being set.

In order to set the shutter, the setting member 74 is provided with a post 75 which lies in the path of a lug 76 on the slide 57, which is connected to the winding arm 31 by the flexible connection 55. Consequently, when the winding arm 31 is moved to wind the film, lug 76, through engagement with pin 75, turns the ring 74 until the lug 77 engages the latch 78 which is pivoted to 7 on the end of a trigger member 79 by a stud 80 and having a fork 81 adapted to be engaged by the shutter trigger release member 82. Thus, when the shutter trigger is moved in its slot 83 (Fig. 1) toward the camera body, the trigger 78 releases the lug 77, and the ring 74 will rapidly turn under the impulse of spring 84. This, through the driving member 72 and arm 71, will open and close the shutter.

There is no need to describe in detail the timing mechanism by which various different times of exposures can be produced, because this is the subject of my copending application Serial No. 108,396, filed October 30, 1936.

From Fig. 6 it should be noted that the driving member 72 has a groove 85 extending around its central pivot 86. The reason for this groove is that the arm 87, which is pivoted at 88 to member 7, is provided with a downwardly extending lug 89 which extends into the groove 85. Since arm 87 is connected by the member 90 to the trigger 79, being attached thereto by means of the lug 91, the trigger cannot move unless the arm 87 moves.

Consequently, if an effort is made to move the trigger 82, and the lug 89 lies in the groove 85, the trigger will not release the shutter. The reason for this is as follows: If the film has not been fully wound, and consequently, if the handle 40 should not be in its normal position of rest, in which it engages the spring latch 36—37, the slide 57 will not have returned to its lowermost position. Consequently, the cam surface 92 will not have raised the end 93 of the lever 87 and removed lug 89 from the groove 85. Therefore, it is necessary to return the winding lever to its position of rest before an exposure can be made.

It should be noted that the slide 57 is normally moved toward the shutter front by means of a spring 94, but the action of this spring is not sufficiently strong to release the latch 48—49, and this can only be done by the pin 75 of the shutter setting member coming to its normal position of rest against the lug 76. Thus, when an exposure has been made and ring 74 moves under the impulse of spring 84, the pin 75 swings quickly around and sharply strikes the lug 76, drawing the flexible connection 55 taut and releasing the latch 48—49.

If it were only necessary to return the winding arm 31 to its initial position of rest before making an exposure, it would be possible to make an exposure without fully winding the film. With this type of winding mechanism, the arm must be oscillated back and forth a number of times before the film is wound. However, with the mechanism which will now be described, it is necessary to move the arm 31 one complete stroke before it can be returned to its initial position of rest. Consequently, if an operator starts to wind film, it is thought there is very little chance that the film would be left incompletely wound.

Again referring to Figs. 7 to 10, inclusive, the structure which prevents the arm from being returned to its normal position of rest until the first full stroke of the arm is made is as follows: The ratchet teeth 44 on the enlarged end 43 of the arm 31 are adapted to be engaged by a pawl member 96. This pawl member is provided with a downwardly extending lug 97, a slot 98, which turns on and slides about a pin 99, and a tail 100, which is adapted to either swing above or engage the inwardly extending projection 101. A spring 102 normally presses the pawl towards the ratchet teeth, and the spring is provided with a grooved end 103 which is adapted to retain the pawl in a set position upon its pivot 99, since a rounded projection 104 on the pawl is adapted to be engaged by the spring projection 103, which may rest on either side of the projection 104—Fig. 7 shows one position and Fig. 10 shows the other.

With the parts in the position shown in Fig. 7, as soon as the flexible cable 55 is drawn taut, and the arm 31 released, the arm may be swung in a clockwise direction while the pawl 96 snaps over the ratchet teeth 44.

Should the operator turn the arm 31 only to the position shown in Fig. 9, if he attempted to return the arm to its position of rest in a counter-clockwise direction, the pawl 96 would engage a ratchet tooth 44 and would prevent this return movement. Accordingly, the operator would again turn the arm 31 to its upper extent of movement indicated in Fig. 10, in which the shoulder 45 engages the end 96 of the pawl, moving it upon the pivot 99 until the tail 108 is engaged behind the shoulder 101. In this position the pawl member is held out just beyond the end of the ratchet teeth 44 so that the arm may be now turned in counter-clockwise direction without being obstructed by the pawl.

The operator may now make as many strokes as he desires, and these may be either full strokes or part strokes. As he oscillates the lever 31 he watches the film number appear in the usual red window in the camera back and stops the winding operation at any desired point, after which he swings the handle down to its normal position of rest, seating the latch members 36 and 37. Just before this seating operation occurs, flange 46 strikes lug 97 on the pawl and moves it upon the stud 99 back to the initial position shown in Fig. 7. In this position the latch 48—49 likewise becomes engaged.

It will thus be seen that it is necessary to make one full winding stroke with the handle 31 in order to release the pawl 96. Consequently, the film operation must actually be started before the arm 31 can be returned to its initial position of rest, and before it is in position to permit the flexible connection 55 to raise the latching arm 87 to remove the lug 89 from the groove 85, and consequently permit the shutter trigger to be operated.

There is an additional reason for requiring arm 31 to make one full stroke in winding a film into place. Unless this arm is moved to its upper limit of movement, which is defined by the engagement of projection 45 with the end of the pawl 96, the flexible connection 55 will not cause the slide 57 to move far enough for the shutter setting member 77 to engage the trigger 78. Consequently, it is during this first full stroke of the winding lever that the shutter is set.

After the winding operation has been completed and the winding arm returned to its normal position of rest, the shutter trigger is unlatched for operation and an exposure can be made.

I claim:

1. In a roll film camera, the combination with a camera body, of a spool chamber therein, a winding key extending into the spool chamber, a movable arm for turning the winding key adapted to move between two limits of movement, cooperating elements on the movable winding arm and camera body for preventing movement of the arm in one direction until movement in the other direction is completed.

2. In a roll film camera, the combination with a camera body, of a spool chamber therein, a winding key extending into the spool chamber, a movable arm for turning the winding key adapted to move between two limits of movement, cooperating elements on the movable winding arm and camera body including a pawl and ratchet for preventing movement of the arm in one direction until movement in the other direction is completed.

3. In a roll film camera, the combination with a camera body, of a spool chamber therein, a winding key extending into the spool chamber, a movable arm for turning the winding key adapted to move between two limits of movement, cooperating elements on the movable winding arm and camera body including a pawl and ratchet, said ratchet having a lug at one end for disengaging the pawl whereby movement of the arm in one direction is prevented until movement in the other direction is completed to release the pawl.

4. In a roll film camera, the combination with a camera body, of a spool chamber therein, a winding key extending into the spool chamber, a movable arm for turning the winding key adapted to move between two limits of movement, cooperating elements on the movable winding arm and camera body including a pawl and ratchet, said ratchet having a lug at one end for disengaging the pawl whereby movement of the arm in one direction is prevented until movement in the other direction is completed to release the pawl, and a latch for locking said arm against movement, a shutter, a member for setting the shutter and connections between the arm and shutter setting lever for releasing the latch.

5. In a roll film camera, the combination with a camera body, of a spool chamber therein, a winding key extending into the spool chamber, a movable arm for turning the winding key adapted to move between two limits of movement, a latch for holding the arm against movement, a shutter, a movable member for setting the shutter, and operable connections between the shutter setting lever and the latch for releasing the latch.

6. In a roll film camera, the combination with a camera body, of a spool chamber therein, a winding key extending into the spool chamber, a movable arm for turning the winding key adapted to move between two limits of movement, a latch for holding the arm against movement, a shutter, a movable member for setting the shutter, and operable connections including a flexible connection between the shutter setting lever and arm adapted to release the latch.

7. In a roll film camera, the combination with a camera body, of a spool chamber therein, a winding key extending into the spool chamber, a movable arm for turning the winding key adapted to move between two limits of movement, a latch for holding the arm against movement, a shutter, a movable member for setting the shutter, and operable connections including a flexible connection between the shutter setting member, and arm and adapted to be stretched taut or to lie loose, said latch lying in the path of the flexible cable when taut and adapted to be moved thereby to release the arm.

8. In a roll film camera, the combination with a camera body, of a spool chamber therein, a winding key extending into the spool chamber, a movable arm for turning the winding key adapted to move between two limits of movement, a latch for holding the arm against movement, a shutter, a movable member for setting the shutter, and operable connections including a flexible connection between the shutter setting member, and arm and adapted to be stretched taut or to lie loose, said latch lying in the path of the flexible cable when taut and adapted to be moved thereby to release the arm and means for tensioning the flexible connections including the shutter setting member.

9. In a roll film camera, the combination with a camera body, of a spool chamber therein, a winding key extending into the spool chamber, a movable arm for turning the winding key adapted to move between two limits of movement, a latch for holding the arm against movement, a shutter, a movable member for setting the shutter, having a set position and an unset position, a spring for moving the member towards its unset position, operable connections between the arm and setting lever for releasing the latch as said setting lever moves under the impulse of the spring toward its unset position.

10. In a roll film camera, the combination with a camera body, of a spool chamber therein, a winding key extending into the spool chamber, an oscillatable arm connected thereto to turn said key in one direction and having a movement limited in two directions, a seat at one limit of movement defining an inoperative position of rest, a shutter, a trigger for the shutter, a setting member for the shutter, connections between the shutter setting member and the arm adapted to prevent the operation of the trigger except when said arm is in its inoperative position of rest.

11. In a roll film camera, the combination with a camera body, of a spool chamber therein, a winding key extending into the spool chamber, an oscillatable arm connected thereto to turn said key in one direction and having a movement limited in two directions, a seat at one limit of movement defining an inoperative position of rest, a shutter, a trigger for the shutter, a setting member for the shutter, a flexible connection between the shutter setting member and arm, means for preventing the operation of the trigger including the flexible connection, said flexible connection being of a length such that when said arm is in its inoperative position of rest the flexible connection may flex and when the arm is not in its position of rest the flexible connection will be taut and will prevent the operation of the trigger.

12. In a roll film camera, the combination with a camera body, of a spool chamber therein, a winding key extending into the spool chamber, a movable arm for turning the winding key adapted to move between two limits of movement, cooperating elements on the movable winding arm and camera body including a pawl and ratchet for preventing movement of the arm in one direction until movement in the other direction is completed, a slidable mount for the pawl, means included in the ratchet for disengaging the pawl and ratchet when movement of the arm in one direction is completed, and means also included in the ratchet for moving the pawl to engage the ratchet when said arm is moved to the other limit of its movement.

13. In a roll film camera, the combination with a camera body, of a spool chamber therein, a winding key extending into the spool chamber, a movable arm for turning the winding key adapted to move between two limits of movement, cooperating elements on the movable winding arm and camera body including a pawl and ratchet for preventing movement of the arm in one direction until movement in the other direction is completed, a slidable mount for the pawl, a tail on the pawl, a lug adapted to engage the tail when the pawl is moved to one position, a lug on the ratchet for moving the pawl so that its tail will engage the lug whereby the pawl may be rendered inoperative, and means included in the pawl and ratchet to restore the pawl to an operative position when the film winding arm is moved to one of its limits of movement.

14. In a roll film camera, the combination with a camera body, of a spool chamber therein, a winding key extending into the spool chamber, a movable arm for turning the winding key adapted to move between two limits of movement, cooperating elements on the movable winding arm and camera body including a pawl and ratchet for preventing movement of the arm in one direction until movement in the other direction is completed, a slidable mount for the pawl, a tail on the pawl, a lug adapted to engage the tail when the pawl is moved to one position, a lug on the ratchet for moving the pawl so that its tail will engage the lug whereby the pawl may be rendered inoperative, and means included in the pawl and ratchet to restore the pawl to an operative position when the film winding arm is moved to one of its limits of movement, and a spring operatively engaging and holding the pawl in either its operative or inoperative positions.

15. In a roll film camera, the combination with a camera body, of a spool chamber therein, a winding key extending into the spool chamber, a movable arm for turning the winding key adapted to move between two limits of movement, in one of which the arm extends from the camera and in the other of which it lies in a normal position of rest against the camera body, a notched arcuate surface carried by said arm, a latch adapted to engage the arcuate surface and notch, a spring urging said latch toward said arcuate surface and notch whereby said latch may lie in the notch locking the arm against movement when said arm is in its normal position of rest, a shutter, a shutter setting member and connections between the shutter setting member and arm adapted to trip the latch when the shutter setting member moves to one position.

16. In a roll film camera, the combination with a camera body, of a spool chamber therein, a winding key extending into the spool chamber, a movable arm for turning the winding key adapted to move between two limits of movement, in one of which the arm extends from the camera and in the other of which it lies in a normal position of rest against the camera body, a notched arcuate surface carried by said arm, a latch adapted to engage the arcuate surface and notch, a spring urging said latch toward said arcuate surface and notch whereby said latch may lie in the notch locking the arm against movement when said arm is in its normal position of rest, a shutter, a shutter setting member, a spring for moving the shutter setting member towards an inoperative position, connections between the shutter setting member and arm and adapted to be actuated by the shutter setting member spring moving it to an inoperative position for tripping the latch and releasing the arm for winding film.

17. In a roll film camera, the combination with a camera body, of a spool chamber therein, a winding key extending into the spool chamber, a movable arm for turning the winding key adapted to move between two limits of movement, in one of which it lies in an inoperative position against the camera, a shutter, a setting member for the shutter, a spring tending to hold said member in an inoperative position, a trigger, means for locking the trigger against movement, a slidable member connected to the film winding arm and to the shutter setting member, and carried by the slide for releasing the trigger, said means being actuated by the spring of the shutter setting member.

18. In a roll film camera, the combination with a camera body, of a spool chamber therein, a winding key extending into the spool chamber, a movable arm for turning the winding key adapted to move between two limits of movement, in one of which it lies in an inoperative position against the camera, a shutter, a setting member for the shutter, a spring tending to hold said member in an inoperative position, a trigger, means for locking the trigger against movement, comprising an interengaging groove and lug, a slidable member connected to the film winding arm and to the shutter setting member, a lug on said slide adapted to engage the shutter trigger and lift the lug from the groove to position the trigger for making an exposure.

19. In a roll film camera, the combination with a camera body, of a spool chamber therein, a winding key extending into the spool chamber, a movable arm for turning the winding key adapted to move between two limits of movement, in one of which it lies in an inoperative position against the camera, a shutter, a setting member for the shutter, a spring tending to hold said member in an inoperative position, a trigger, means for locking the trigger against movement, comprising an interengaging groove and lug, a slidable member connected to the film winding arm and to the shutter setting member, a lug on said slide adapted to engage the shutter trigger and lift the lug from the groove to position the trigger for making an exposure, said slide being adapted to be engaged and moved by the shutter setting member moving under the impulse of its spring to its inoperative position.

20. In a roll holding camera, the combination with a camera body including a spool chamber therein, of a winding key extending into the spool chamber, an oscillatable arm for moving the winding key, a one way clutch for turning the key in one direction only between the key and arm, a handle on said arm, a spring lock adapted to hold the arm in an inoperative position against the camera body, means for releasing the latch by the handle, a shutter, a trigger for the shutter and movable connections between the arm carrying the handle and the shutter preventing the operation of the latter except when the handle is latched against the camera body.

21. In a roll holding camera, the combination with a camera body including a spool chamber therein, of a winding key extending into the spool chamber, an oscillatable arm for moving the winding key, a one way clutch for turning the key in one direction only between the key and arm, a handle on said arm, a spring lock adapted to hold the arm in an inoperative position against the camera body, means for releasing the latch by the handle, a shutter, a trigger for the shutter, a latch for the trigger, movable connections between the arm and the shutter including a member to engage said trigger to release the trigger latch, said movable connections being operable to release the trigger latch only when the handle is locked against the camera body.

22. In a roll holding camera, the combination with a camera body including a spool chamber therein, of a winding key extending into the spool chamber, an oscillatable arm for moving the winding key, a one way clutch for turning the key in one direction only between the key and arm, a spring operated latch for holding the arm in a normal position of rest, a shutter, a setting member for the shutter, a spring for moving the setting member towards an inoperative position and connections between the handle and shutter through which said handle latch may be released actuated by the shutter setting member.

23. In a roll film camera, the combination with a camera body, of a spool chamber therein, a winding key, an oscillatable arm for turning the key, a one way clutch between the arm and key, a latch carried by the camera, a spring for pressing the latch into engagement with the arm, a handle carried by the arm and having a latching engagement with the camera, a shutter, connections between the shutter and arm for releasing the arm latch, said latch being independent of the handle latch and means carried by the arm for preventing the operation of the arm latch as long as said handle remains unlatched from the camera casing.

JOSEPH MIHALYI.